(12) United States Patent
Aranzulla et al.

(10) Patent No.: US 7,914,041 B2
(45) Date of Patent: Mar. 29, 2011

(54) OCCUPANT PROTECTION DEVICE ON THE PASSENGER SIDE

(75) Inventors: Daniele Aranzulla, Essingen (DE); Bernd Issler, Urbach (DE)

(73) Assignee: TRW Automotive GmbH, Aldorf (DE)

( * ) Notice: Subject to any disclaimer, the term of this patent is extended or adjusted under 35 U.S.C. 154(b) by 67 days.

(21) Appl. No.: 11/810,738

(22) Filed: Jun. 7, 2007

(65) Prior Publication Data
US 2007/0290489 A1    Dec. 20, 2007

(30) Foreign Application Priority Data

Jun. 14, 2006   (DE) .................. 10 2006 027 588

(51) Int. Cl.
*B60R 21/205*   (2006.01)
*B60R 21/231*   (2006.01)
(52) U.S. Cl. .................. 280/743.2; 280/743.1
(58) Field of Classification Search .................. 280/729, 280/743.2, 743.1
See application file for complete search history.

(56) References Cited

U.S. PATENT DOCUMENTS

| 5,489,119 | A  | * | 2/1996 | Prescaro et al. | ........... 280/743.2 |
| 6,371,509 | B1 |   | 4/2002 | Ellerbrok et al. | |
| 6,443,488 | B1 | * | 9/2002 | Kippelt et al. | ................ 280/735 |
| 6,502,858 | B2 | * | 1/2003 | Amamori | .................... 280/743.2 |
| 6,932,385 | B2 | * | 8/2005 | Hawthorn et al. | ............ 280/739 |
| 2005/0057029 | A1 | * | 3/2005 | Thomas | ..................... 280/743.2 |
| 2007/0210568 | A1 | * | 9/2007 | Thomas et al. | ............ 280/743.2 |

FOREIGN PATENT DOCUMENTS

| DE | 19946413 | 4/2000 |
| DE | 20317038 | 3/2004 |
| EP | 1193136 | 4/2002 |

* cited by examiner

*Primary Examiner* — Ruth Ilan
*Assistant Examiner* — Keith Frisby
(74) *Attorney, Agent, or Firm* — Tarolli, Sundheim, Covell & Tummino LLP

(57) ABSTRACT

An occupant protection device on a passenger side of a vehicle includes a gas bag (16) having a front wall (18) facing an interior of the vehicle. The occupant protection device further includes a tether strap (26) arranged inside the gas bag (16). The tether strap (26) has a first fastening section (32) and an elongated second fastening section (40). The first and second fastening sections (32, 40) are fastened to the front wall (18) of the gas bag (16). The second fastening section (40) extends substantially vertically in an unfolded state of the gas bag (16).

13 Claims, 3 Drawing Sheets

US 7,914,041 B2

OCCUPANT PROTECTION DEVICE ON THE PASSENGER SIDE

TECHNICAL FIELD

The invention relates to an occupant protection device on a passenger side of a vehicle.

BACKGROUND OF THE INVENTION

Such a device, including a gas bag having a front wall facing an interior of the vehicle, and a tether strap arranged inside the gas bag, which is fastened to the front wall of the gas bag by a first fastening section of the tether strap, is known from US 2003/0057691. The gas bag of this device is provided with a multipart tether strap. The tether strap is composed of a rectangular fastening section mounted on the front wall of the gas bag and of two connecting sections extending from the vertical sides of the fastening section, which are connected to an end section fastened to the inflation opening of the gas bag. The shape of the gas bag and of the tether strap are coordinated with each other such that the gas bag unfolds substantially firstly upwards, then downwards, and lastly towards the occupant. This unfolding behaviour is advantageous for an occupant who is situated very close to the instrument panel of the vehicle.

However, in occupant protection devices with a gas bag on the passenger side, the problem fundamentally exists that different gas bag unfolding behaviours are desired not only depending on the position of an occupant on the passenger seat, but also depending on the type of occupancy of the passenger seat. In the case of a child's seat mounted on the passenger seat, it has been usual practice to disconnect the protection device entirely, in so far as a sensor arrangement to detect a child's seat is provided in the vehicle. However, legal stipulations already exist, which relate to the case of an activation of an airbag when the passenger seat is occupied by a rearward-facing child's seat.

It is an object of the invention to provide an occupant protection device on the passenger side of a vehicle, having a flexible unfolding behaviour and with which the above-mentioned legal stipulations can be adhered to.

SUMMARY OF THE INVENTION

According to the invention, an occupant protection device on a passenger side of a vehicle comprises a gas bag having a front wall facing an interior of the vehicle. The occupant protection device further comprises a tether strap arranged inside the gas bag. The tether strap has a first fastening section and an elongated second fastening section. The first and second fastening sections are fastened to the front wall of the gas bag. The second fastening section extends substantially vertically in the unfolded state of the gas bag. The first fastening section is provided so that it rests against the shell of a rearward-facing child's seat mounted on the passenger seat, during the unfolding of the gas bag. Thereby, a further unfolding in this direction is counteracted. In addition, the second fastening section leads to the formation of a constriction running vertically, so that the gas bag offers a recess in the head region of a child who is accommodated in the child's seat.

The possibility of an advantageous construction of the tether strap in a single piece is enabled through a development in which the second fastening section adjoins the first fastening section.

In order to reliably confine the unfolding of the gas bag in the longitudinal direction of the vehicle in the case of application described above, the length of the tether strap is preferably dimensioned so that during the unfolding of the gas bag, the first fastening section rests against a rearward-facing child's seat mounted on the passenger seat of the vehicle, without the tether strap tearing.

According to the preferred embodiment of the invention, the second fastening section is part of a sail with side sections which are fastened to a longitudinal section of the tether strap. The sail can be constructed integrally with the rest of the tether strap.

In order to achieve an optimum unfolding of the gas bag for the case where the passenger seat is not occupied by a child's seat, but by a vehicle occupant sitting in normal position, the tether strap advantageously has a breaking site at which the tether strap tears at a predetermined expansion of the gas bag in the longitudinal direction of the vehicle. When the unfolding gas bag therefore does not strike onto a child's seat or an occupant situated very close to the instrument panel, the gas bag can assume its full expansion in the longitudinal direction of the vehicle after the tearing of the tether strap.

A further development of the invention provides a sensor arrangement to classify an occupant on the passenger seat, and a multi-stage filling device for the gas bag, the gas bag with the tether strap being designed so that the tether strap does not tear during the filling of the gas bag in a first inflation stage of the filling device. Thus, a rapid unfolding of the gas bag can be achieved with a smaller gas bag volume for the purpose of an optimum adaptation of the quantity of gas which is provided by the filling device in the case of a small or light occupant.

DETAILED DESCRIPTION OF THE PREFERRED EMBODIMENT

Figure 1:
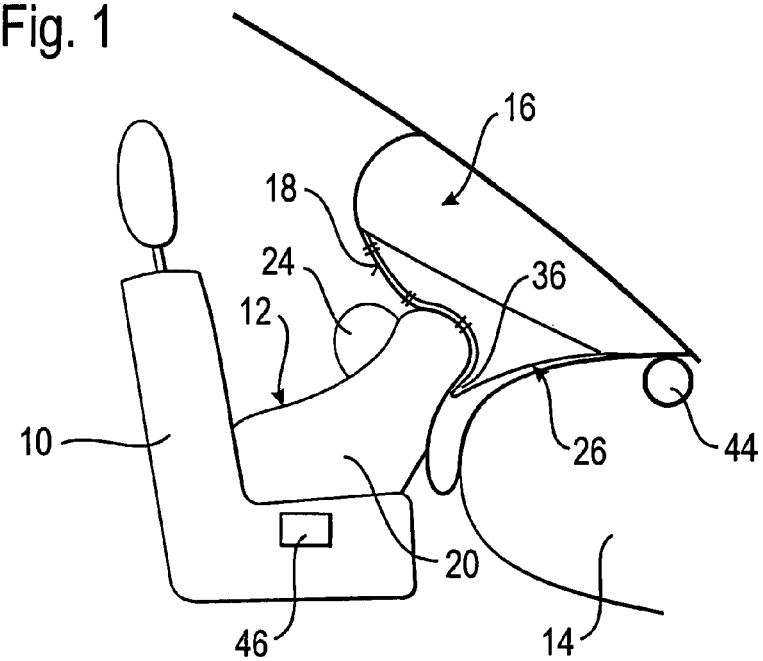
FIG. 1 shows an occupant protection device according to the invention in a first case of application.
Figure 2A:
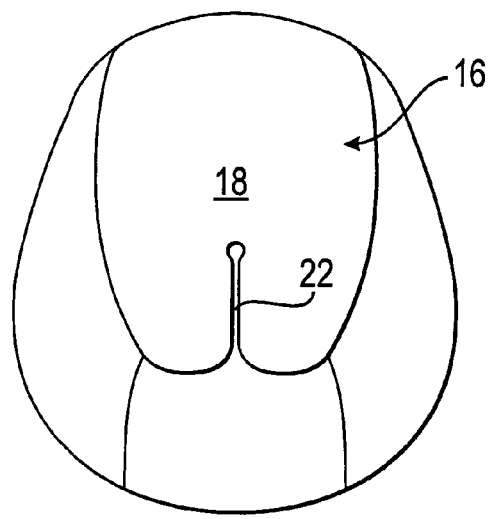
FIGS. 2a and 2b show the gas bag of FIG. 1 in top view and in perspective view.
Figure 2B:
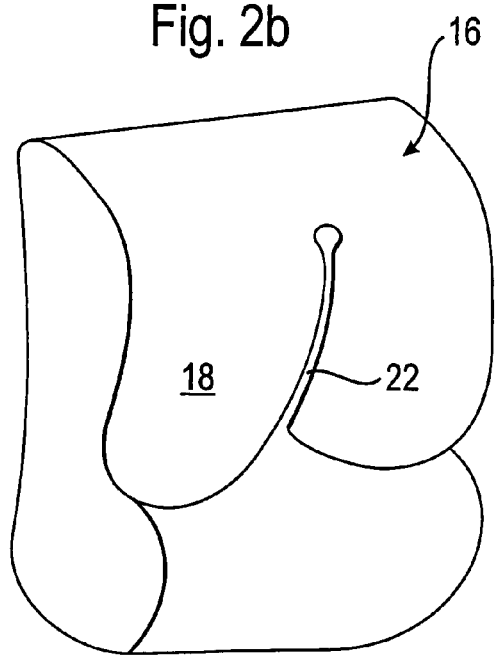

In FIG. 1, a passenger seat 10 in a motor vehicle with a child's seat 12 mounted thereon, and an occupant protection device according to the invention in the activated state are shown. A gas bag 16, unfolded from the instrument panel region 14 of the vehicle, has a front wall 18 facing the interior of the vehicle, a portion of which rests against the stable shell 20 of the child's seat 12. As can be seen from FIGS. 2a and 2b, the gas bag 16 in the unfolded state has in addition a constriction (fold) 22 running vertically, so that the gas bag 16 offers a recess in the head region 24 of the child who is accommodated in the child's seat 12.

Figure 3:
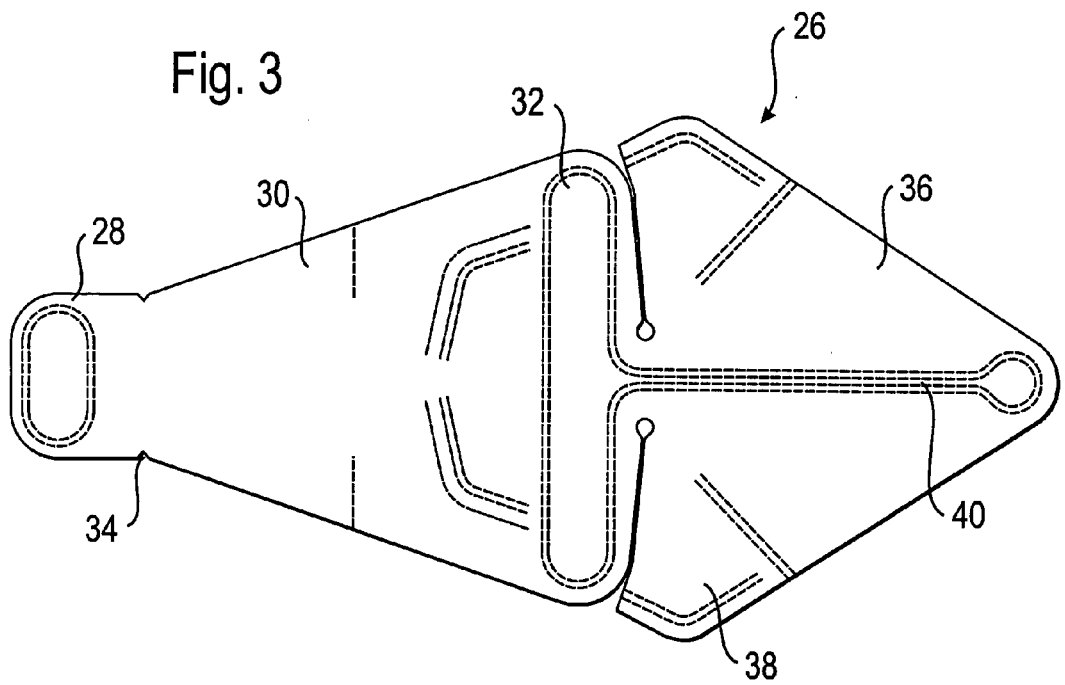
FIG. 3 shows a blank for a tether strap for an occupant protection device according to the invention.

This gas bag shape is determined substantially by a tether strap 26 arranged inside the gas bag 16. The tether strap 26 is shown in FIG. 3 as an unworked blank and in FIG. 4 in the finished mounted state. The tether strap 26 has an end section 28 fastened to the inflation opening of the gas bag 16, a longitudinal section 30 and a substantially rectangular fastening section 32, by which the tether strap 26 is fastened flat against the inner side of the front wall 18 of the gas bag 16. The longitudinal section 30 has a breaking site 34 in the vicinity of the end section 28. The width of the tether strap 26 increases from the breaking point 34 up to the fastening section 32.

Figure 4:
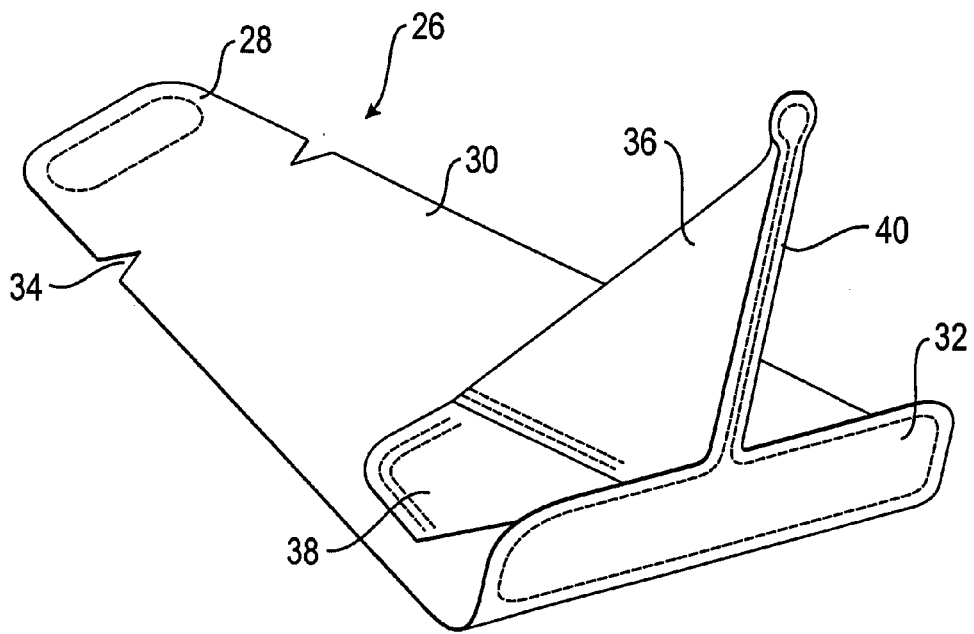
FIG. 4 shows a finished mounted tether strap produced from the blank of FIG. 3.

A sail 36 with side sections 38 joins on to the fastening section 32. As can be seen in FIG. 4, in the finished mounted tether strap 26, the lower edges of the sail 36 are sewn together, and the side sections 38 are sewn to the longitudinal section 30 of the tether strap 26. An elongated, second fastening section 40, which directly adjoins the first fastening section 32 and is likewise fastened to the inner side of the gas bag front wall 18, serves as the "mast" of the sail 36. In the unfolded state of the gas bag 16, the second fastening section 40 extends substantially vertically upwards from the first fastening section 32.

The overall length of the tether strap 26 is dimensioned such that in the case shown in FIG. 1 with a rearward-facing child's seat 12 mounted on the passenger seat 10, the first fastening section 32 rests against the shell 20 of the child's seat 12 and the second fastening section 40 makes provision that the constriction 22, running substantially vertically, forms in the front wall 18 of the gas bag 16. Due to the support on the shell 20 of the child's seat, the tractive force acting in the tether strap 26 is so low that the tether strap 26 does not tear.

Figure 5:
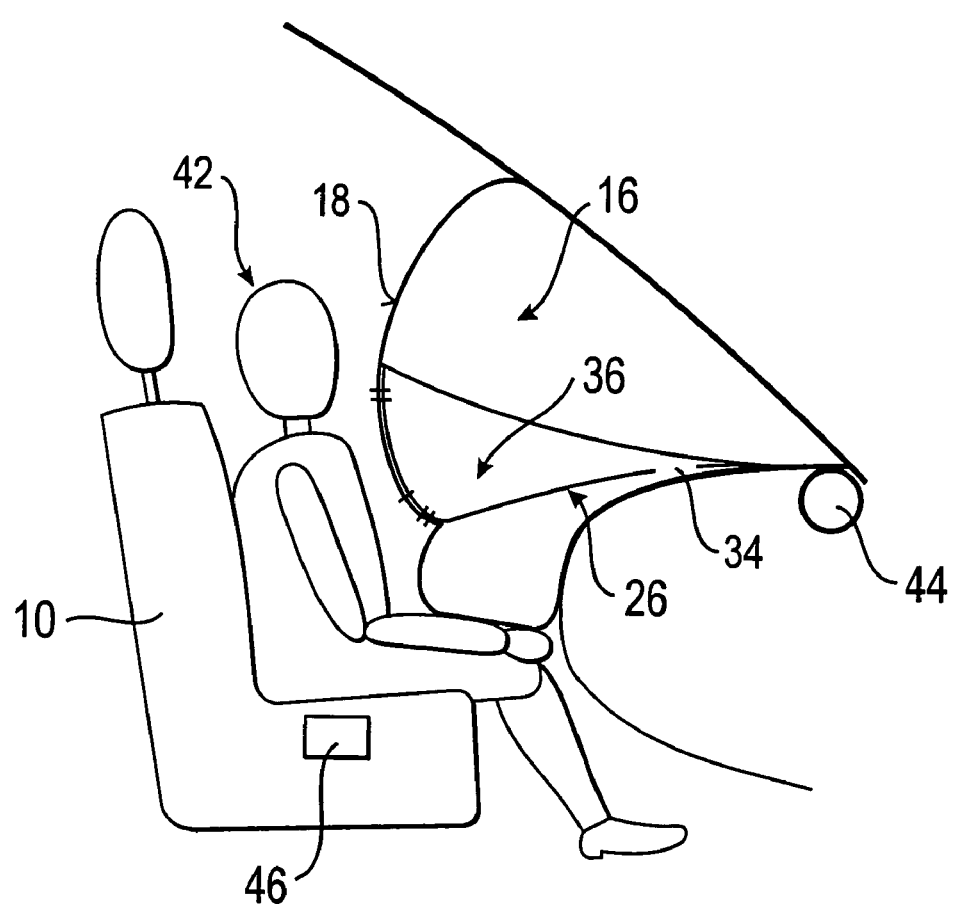
FIG. 5 shows the occupant protection device according to the invention in a second case of application.

FIG. 5 shows the same occupant protection device in the activated state in the case of the passenger seat 10 being occupied by an adult occupant 42. The tether strap 26 does indeed slow down the initial unfolding of the gas bag 16 in the longitudinal direction of the vehicle in the desired manner; however, owing to the lack of support, the tractive force acting on the tether strap 26 becomes so great that the tether strap 26 tears at the breaking point 34. The gas bag 16 can therefore expand further in the longitudinal direction of the vehicle, as can be seen in FIG. 5.

According to a further development of the invention, the filling device for the gas bag 16 is constructed with several stages, e.g. in the form of a multi-stage gas generator 44. In addition, a sensor arrangement 46 is provided, by means of which a vehicle occupant 42 on the passenger seat 10 can be classified. If, for example, the sensor arrangement 46 detects a light or small occupant 42, only the first stage of the gas generator 44 is ignited and only a limited quantity of gas is provided to fill the gas bag 16. The volume of the gas bag 16 thereby reached is dimensioned such that the tether strap 26 does not tear. This leads to a rapid unfolding of the gas bag 16 with an internal pressure which is sufficient for the light or small occupant 42. If, however, the sensor arrangement 46 detects a large or heavy occupant 42, a greater volume of gas is provided by the filling device. In this case, the internal pressure in the gas bag 16 becomes so great that the tether strap 26 tears and the gas bag 16 assumes the shape shown in FIG. 5.

The invention claimed is:

1. An occupant protection device on a passenger side of a vehicle, the occupant protection device comprising a gas bag having a front wall facing an interior of the vehicle, and a tether strap arranged inside the gas bag, the tether strap comprising a first fastening section fastened to the front wall of the gas bag at a substantially rectangular fastening section and an elongated second fastening section directly adjoining the first fastening section, the second fastening section extending substantially vertically upwards from the first fastening section in an unfolded state of the gas bag and being fastened to the front wall of the gas bag, the second fastening section creating a vertically extending constriction in the gas bag.

2. The occupant protection device according to claim 1, wherein the substantially vertically extending second fastening section adjoins the first fastening section at a middle portion of the first fastening section.

3. The occupant protection device according to claim 1, wherein a length of the tether strap is dimensioned such that during an unfolding of the gas bag, the first fastening section rests against a rearward-facing child's seat mounted on a passenger seat of the vehicle, without the tether strap tearing.

4. The occupant protection device according to claim 1, wherein the second fastening section is part of a sail extending from the front wall of the gas bag in a direction away from a passenger seat, the sail having a triangular shape and including side sections which are directly fastened to a longitudinal section of the tether strap.

5. The occupant protection device according to claim 4, wherein the side sections of the sail extend in a plane of the tether strap.

6. The occupant protection device according to claim 5, wherein the side sections extend from lower edges of the sail, the lower edges being sewn together.

7. The occupant protection device according to claim 1, wherein the tether strap has a breaking site at which the tether strap tears at a predetermined expansion of the gas bag in a longitudinal direction of the vehicle, the width of the tether strap increasing from the breaking site up to the first fastening section.

8. The occupant protection device according to claim 1, wherein a sensor arrangement to classify an occupant on the passenger seat, and a multi-stage filling device for the gas bag are provided, the gas bag with the tether strap being designed so that the tether strap does not tear during the filling of the gas bag in a first inflation stage of the filling device.

9. The occupant protection device according to claim 1, wherein the first fastening section and the second fastening section are formed together from a single piece.

10. The occupant protection device according to claim 1, wherein the second fastening section is fastened to the front of the gas bag beginning at the location where the second fastening section adjoins the first fastening section and extending substantially vertically upwards therefrom.

11. An occupant protection device on a passenger side of a vehicle, the occupant protection device comprising a gas bag having a front wall facing an interior of the vehicle, and a tether strap arranged inside the gas bag, the tether strap comprising a first fastening section fastened to the front wall of the gas bag at a substantially rectangular fastening section and an elongated second fastening section directly adjoining the first fastening section, the second fastening section extending substantially vertically upwards from the first fastening section in an unfolded state of the gas bag and being fastened to the front wall of the gas bag, the second fastening section comprising part of a sail extending from the front wall of the gas bag in a direction away from a passenger seat, the sail having a triangular shape and including side sections which are directly fastened to a longitudinal section of the tether strap.

12. The occupant protection device according to claim 11, wherein the side sections of the sail extend in a plane of the tether strap.

13. The occupant protection device according to claim 12, wherein the side sections extend from lower edges of the sail, the lower edges being sewn together.

* * * * *